(12) United States Patent
Osterman

(10) Patent No.: US 10,564,006 B2
(45) Date of Patent: Feb. 18, 2020

(54) STATIC REFERENCE RESOLVER CIRCUIT

(71) Applicant: Rosemount Aerospace Inc., Burnsville, MN (US)

(72) Inventor: Jason T. Osterman, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 94 days.

(21) Appl. No.: 15/370,151

(22) Filed: Dec. 6, 2016

(65) Prior Publication Data

US 2017/0176217 A1   Jun. 22, 2017

Related U.S. Application Data

(60) Provisional application No. 62/268,224, filed on Dec. 16, 2015.

(51) Int. Cl.
| | | |
|---|---|---|
| *G01D 5/20* | (2006.01) | |
| *B64C 13/10* | (2006.01) | |
| *B64D 43/02* | (2006.01) | |
| *B64C 13/04* | (2006.01) | |
| *G01D 3/08* | (2006.01) | |
| *G01D 18/00* | (2006.01) | |

(52) U.S. Cl.
CPC ......... *G01D 5/204* (2013.01); *B64C 13/0423* (2018.01); *B64D 43/02* (2013.01);
(Continued)

(58) Field of Classification Search
CPC .... G01D 5/204; G01D 5/2013; G01D 5/2073; G01D 5/2086; G01D 5/20; G01D 5/208; G01D 5/24452; G01D 5/24461; G01D 3/02; G01D 3/08; G01D 18/00; G01D 5/2066; G01D 5/22; G01D 5/2208; G01D 5/225; G01D 5/2291; B64D 43/02; B64C 13/10; B62D 5/049; B62D 5/046; B62D 5/0463; B62D 5/0487; B62D 15/021; B62D 6/10;
(Continued)

(56) References Cited

U.S. PATENT DOCUMENTS

| | | | | | |
|---|---|---|---|---|---|
| 2,988,918 | A | * | 6/1961 | King | ........................ G01M 1/22 73/462 |
| 4,475,105 | A | * | 10/1984 | Kurosawa | .............. G01D 5/242 318/608 |

(Continued)

FOREIGN PATENT DOCUMENTS

EP          1462340 A1     9/2004

OTHER PUBLICATIONS

Extended European Search Report for EP Application No. 16203832.7, dated Apr. 19, 2017, 8 pages.

*Primary Examiner* — Lee E Rodak
(74) *Attorney, Agent, or Firm* — Kinney & Lange P.A.

(57) ABSTRACT

A sensor, and method of using the sensor, includes a primary resolver circuit and a static reference resolver circuit. The primary resolver circuit is configured to provide first and second primary analog outputs. The primary analog outputs are indicative of a sensed condition of the sensor. The static reference resolver circuit includes a transformer and is configured to generate first and second reference analog outputs indicative of a reference condition of the sensor. The first and second reference analog outputs match the first and second primary analog outputs when the sensed condition is equivalent to the reference condition.

15 Claims, 3 Drawing Sheets

(52) U.S. Cl.
CPC ............ *G01D 3/08* (2013.01); *G01D 5/2073* (2013.01); *G01D 5/2086* (2013.01); *G01D 18/00* (2013.01)

(58) Field of Classification Search
CPC ............ G01P 3/44; G01P 13/045; G01P 3/00; H03M 1/1071
See application file for complete search history.

(56) References Cited

U.S. PATENT DOCUMENTS

| | | | | |
|---|---|---|---|---|
| 6,191,550 | B1 * | 2/2001 | Yoshihara | B60L 3/0023 318/638 |
| 2002/0173931 | A1 * | 11/2002 | Dudler | G01D 3/022 702/151 |
| 2008/0284366 | A1 * | 11/2008 | Fu | G01D 3/08 318/661 |
| 2009/0167296 | A1 | 7/2009 | Yokokawa | |
| 2012/0185213 | A1 * | 7/2012 | Wada | G01D 3/08 702/183 |
| 2013/0057263 | A1 * | 3/2013 | Hosek | G01D 5/2266 324/207.18 |
| 2014/0172359 | A1 * | 6/2014 | Komatsu | G01D 5/204 702/151 |
| 2015/0073745 | A1 * | 3/2015 | Mizuno | G01P 3/44 702/147 |
| 2016/0054152 | A1 * | 2/2016 | Goto | G01D 5/2073 324/207.12 |

* cited by examiner

STATIC REFERENCE RESOLVER CIRCUIT

BACKGROUND

The present invention relates generally to sensor systems, and in particular to a system and method for providing static reference outputs for sensor systems.

Sensor systems implemented on aircraft, for example, may provide information utilized by various aircraft systems. One such sensor system, for example, is an angle of attack (AOA) sensor having a rotatable vane that is utilized to determine the aircraft angle of attack (i.e., an angle between oncoming airflow or relative wind and a reference line of the aircraft, such as a chord of a wing of the aircraft). The AOA sensor is mounted to the aircraft such that the rotatable vane is exposed to oncoming airflow about the aircraft exterior. Aerodynamic forces acting on the rotatable vane cause the vane to align with the direction of the oncoming airflow (i.e., along a chord extending from a leading edge to a trailing edge of the vane). A resolver circuit may be utilized to provide an analog electrical output that is indicative of the position of the rotatable vane. A controller is then able to determine the AOA based on the resolver output.

These sensor systems may be utilized in flight critical applications, for example, such as stick-shaker applications. In a stick-shaker application, the control yoke of the aircraft is configured to vibrate rapidly to alert a pilot of a possible stall condition. The sensed AOA being greater than a threshold value may be an important factor utilized in stick-shaker applications. Traditionally, to test the stick-shaker application, the mechanical parts of the AOA sensor were moved to a position indicative of an AOA that is greater than the threshold value. This requires costly extra circuitry/mechanical parts. It is desirable to provide reference outputs for AOA sensors, as well as any other sensors that may include resolver circuits, without the need for complex circuitry and moving parts.

SUMMARY

A sensor includes a primary resolver circuit and a static reference resolver circuit. The primary resolver circuit is configured to provide first and second primary analog outputs. The primary analog outputs are indicative of a sensed condition of the sensor. The static reference resolver circuit includes a transformer and is configured to generate first and second reference analog outputs indicative of a reference condition of the sensor. The first and second reference analog outputs match the first and second primary analog outputs when the sensed condition is equivalent to the reference condition.

A method of operating a sensor includes receiving, by the sensor, a voltage reference; generating, using a transformer, a first reference analog voltage based on the voltage reference; generating, using the transformer, a second reference analog voltage based on the voltage reference, wherein the second reference analog voltage is ninety degrees out of phase with the first reference analog voltage; and providing the first and second reference analog voltages as a reference output indicative of a selected condition of the sensor.

A system includes a sensor and a controller. The sensor includes a transformer circuit that includes a primary coil and first and second secondary coils. The primary coil is configured to receive a voltage reference from the controller. The first secondary coil is coupled to the primary coil and configured to provide a first reference analog output to the controller based on a coil angle between the primary coil and the first secondary coil. The second secondary coil is coupled to the primary coil and configured to provide a second reference analog output to the controller based upon the coil angle.

DETAILED DESCRIPTION

A static reference resolver circuit is disclosed herein that includes a transformer with a primary coil and two secondary coils. The static reference resolver circuit may be utilized to provide a static reference condition output for a sensor, for example, such that the reference output matches the sensor's primary output for a selected condition. The two secondary coils are physically configured at a 90° angle from one another. This way, the first coil provides a sine wave voltage output and the second provides a cosine wave voltage output (i.e., the output voltages of the secondary coils are 90° out of phase with one another). The primary coil of the transformer is configured physically at an angle (θ) with the secondary coils of the transformer. The primary coil is configured to receive a reference voltage which induces output voltages in the two secondary coils. The amplitude of the two output voltages are each based upon the amplitude of the reference voltage, the physical angle (θ) between the primary coil and the secondary coils and the turn ratios between the primary coil and the secondary coils. This way, the static reference resolver circuit may be configured to provide an output that matches the output of a selected sensor for a selected sensed condition.

Figure 1:
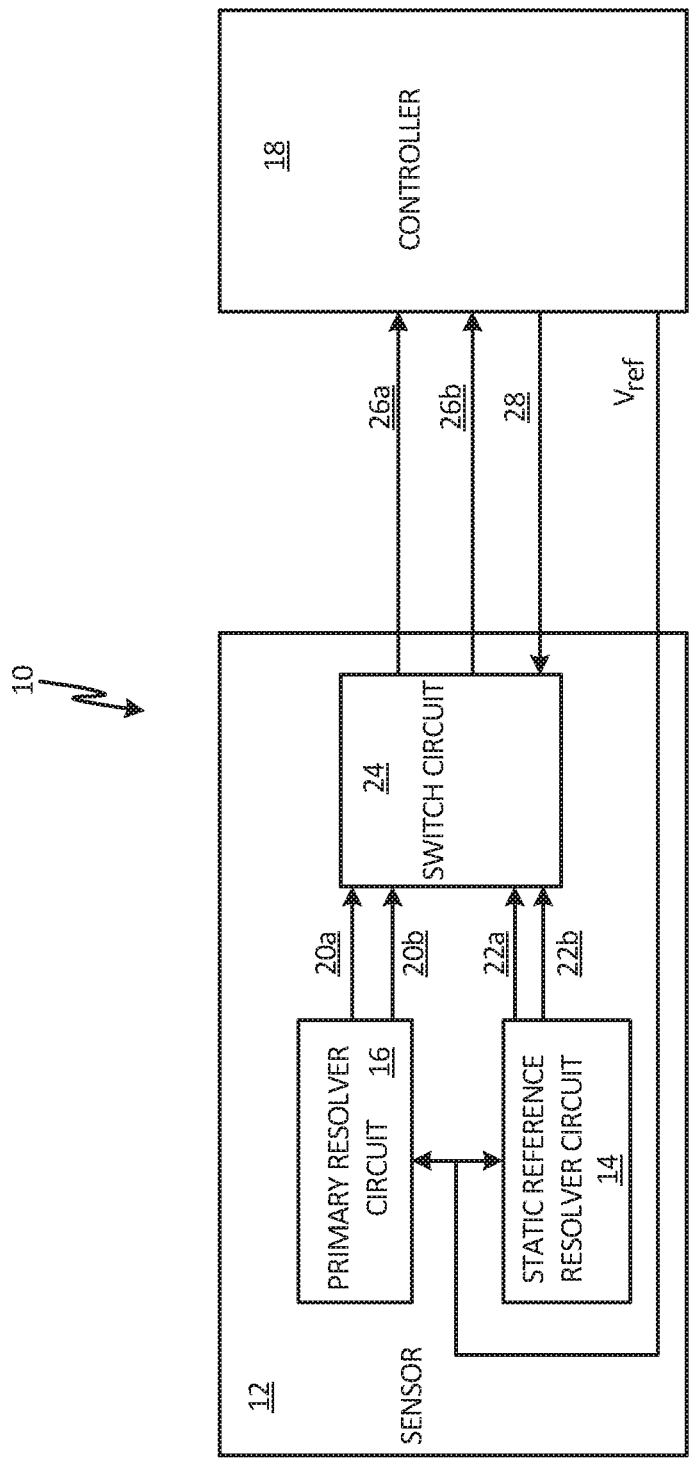
FIG. 1 is a block diagram illustrating a sensor that includes a static reference resolver circuit.

FIG. 1 is a block diagram illustrating a system 10 that includes a sensor 12, which includes static reference resolver circuit 14. System 10 includes sensor 12 and controller 18. Sensor 12 includes static reference resolver circuit 14, primary resolver circuit 16 and switch circuit 24. Primary resolver circuit 16 receives reference voltage ($V_{REF}$) from controller 18 and produces signals 20a and 20b as output, and static reference resolver circuit 14 receives reference voltage ($V_{REF}$) from controller 18 and produces signals 22a and 22b as output. Reference voltage (VREF) may be, for example, an analog alternating current (AC) voltage with a peak amplitude of 26 volts. While illustrated as a single static reference resolver circuit 14, any number of static reference resolver circuits 14 may be implemented with sensor 12 for a desired number of static reference conditions.

Switch circuit 24 receives signals 20a, 20b, 22a and 22b as input. Signals 20a and 20b may be sine and cosine analog electrical signals, for example, that are indicative of a sensed value of sensor 12. Signals 22a and 22b may also be sine and cosine analog signals that match those of signals 20a and 20b for a selected reference condition. Switch circuit 24 may be configured to select between the first set of signals 20a and 20b and the second set of signals 22a and 22b to provide a single set of signals 26a and 26b for controller 18. Switch circuit 24 also receive control input 28 from controller 18. Control signal 28 may be provided as input to switch circuit 24 from controller 18 to control the selection between signals 20a and 20b, and signals 22a and 22b. Switch circuit 24 may be implemented using any type of electrical or mechanical switches such as, for example, metal-oxide-semiconductor field-effect transistors (MOSFETs), electro-mechanical relays or any other type of switch, and may be configured as any type of circuit capable of selecting a single output from two or more inputs.

Controller 18 may be any controller configured to receive and process signals 26a and 26b from sensor 12. In an example embodiment, controller 18 may be a microcontroller implemented in an aircraft avionic system and sensor 12 may be an angle of attack (AOA) sensor. In this example, sensor 12 may include a rotatable vane and shaft. The shaft may be connected to the rotatable vane such that rotation of the rotatable vane causes corresponding rotation of the shaft. Primary resolver circuit 16 may generate signals 20a and 20b that are indicative of the angular position of the shaft. Controller 18 may be configured to determine the AOA based upon signals 20a and 20b.

In the example embodiment, controller 18 may be utilized in a stick-shaker application. The sensed AOA from sensor 12 may be utilized by the stick-shaker application as a factor in determining if the yoke should vibrate for the pilot. Safety critical applications, such as the stick-shaker application, are traditionally tested on the ground to ensure functionality prior to flight. Therefore, during testing of the application, the output of the AOA sensor must be configured to indicate a desired condition for test, even though the aircraft is at an undetermined or unspecified AOA (i.e., on the ground). In prior art systems, complex and costly mechanical and electrical circuitry was needed to manually adjust the angular position of the shaft of the AOA sensor such that primary resolver circuit 16 would output the selected condition as signals 20a and 20b. This testing method increases the cost of the system, and requires moving parts, which may decrease reliability and life of the part.

Static reference resolver circuit 14 may be implemented in addition to, and separate from, primary resolver circuit 16 to provide signals 22a and 22b that are indicative of the selected reference condition of sensor 12. For example, if a desired reference condition for a test in the example above is an output indicative of a 45° AOA, static reference resolver circuit 14 may be configured to provide static analog electrical signals as signals 22a and 22b that mimic signals 20a and 20b for a sensed AOA of 45°. For example, primary resolver circuit may provide signals 20a and 20b as sine and cosine waves of equal amplitude for a sensed AOA of 45°. Static reference resolver circuit 14 may therefore be configured to generate signals 22a and 22b as static sine and cosine waves of equal amplitude to indicate a reference condition of 45°. Controller 18 may therefore utilize control signal 28 to select signals 22a and 22b as output on signals 26a and 26b during a test condition, for example, and may utilize control signal 28 to select signals 20a and 20b during normal operation. This way, the costly circuitry and moving parts that were needed in prior art sensor systems to provide a reference condition for a test case for sensor 12 may be eliminated.

Figure 2A:
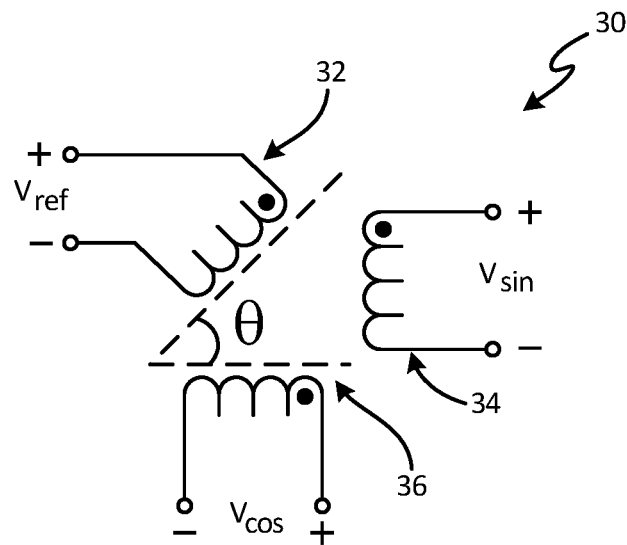
FIGS. 2A-2C are circuit diagrams illustrating embodiments of a static reference resolver circuit.
Figure 2B:
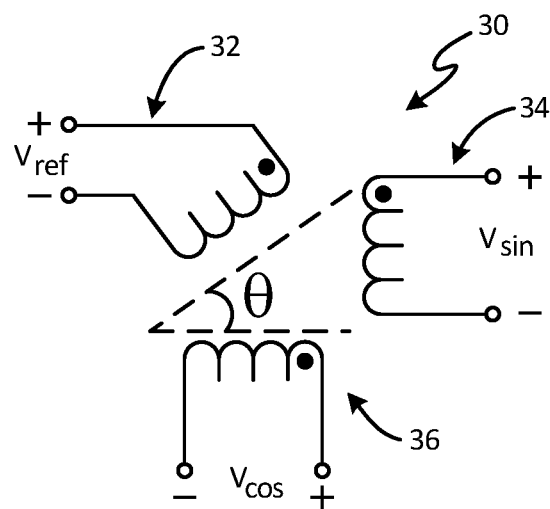
Figure 2C:
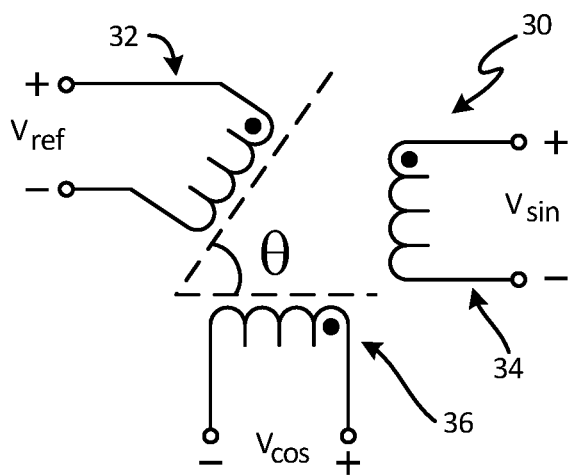
Figure 3A:
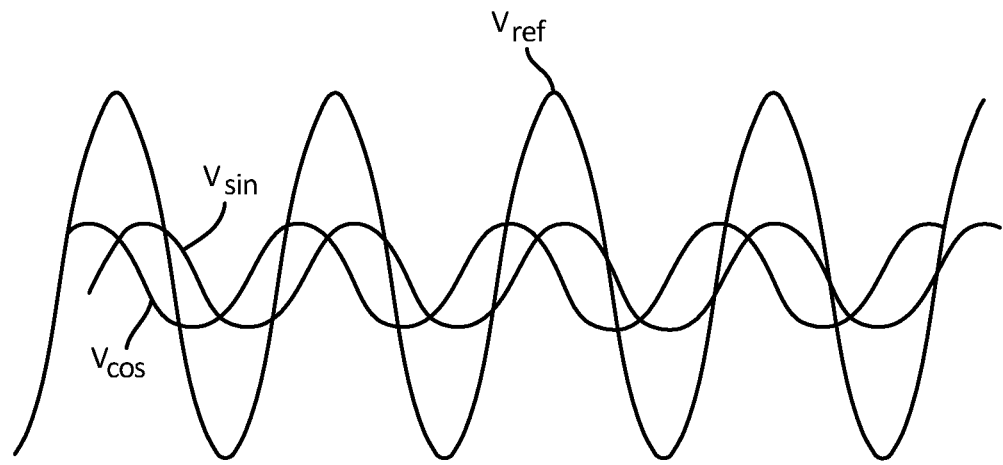
FIGS. 3A-3C are waveforms illustrating analog inputs and outputs for embodiments of a static reference resolver circuit.
Figure 3B:
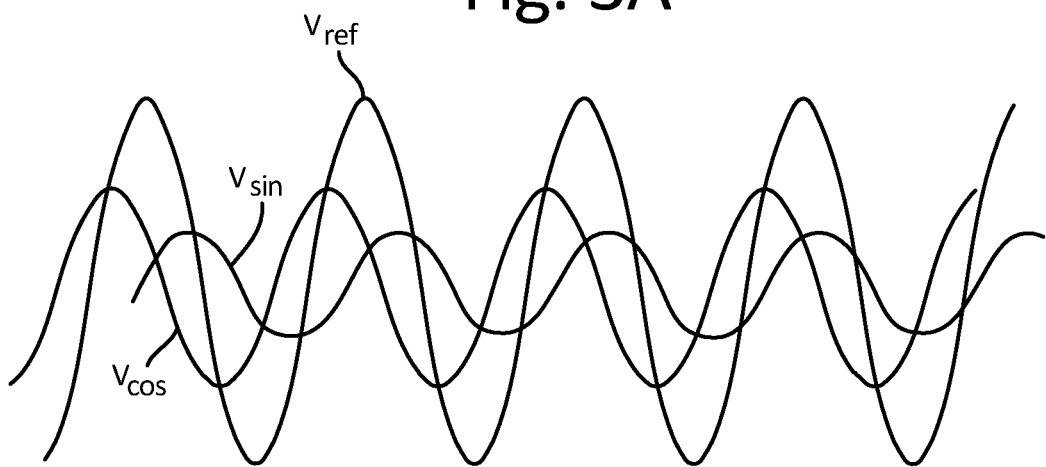
Figure 3C:
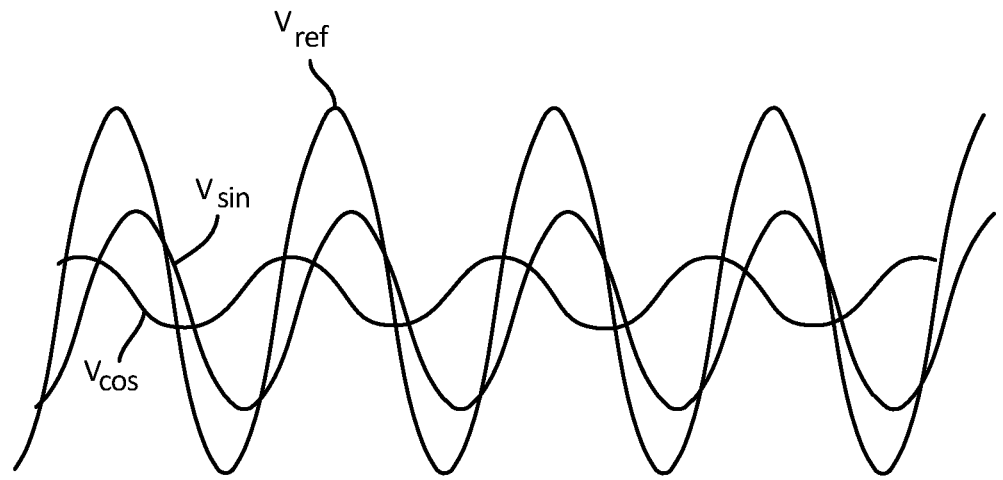

With continued reference to FIG. 1, FIGS. 2A-2C are circuit diagrams illustrating embodiments of static reference resolver circuit 14, and FIGS. 3A-3C are respective waveforms illustrating analog inputs and outputs for the embodiments of static reference resolver circuit 14. Static reference resolver circuit 14 includes transformer 30, which includes primary coil 32 and secondary coils 34 and 36. Primary coil 32 is electromagnetically coupled to secondary coils 34 and 36 and is configured to receive the reference voltage $V_{REF}$.

Voltage $V_{REF}$ in primary coil 32 induces voltages in secondary coils 34 and 36. $V_{SIN}$ is induced in secondary coil 32 and is provided as signal 22a, and $V_{COS}$ is induced in secondary coil 34 and is provided as signal 22b.

To set the relative magnitudes of $V_{SIN}$ and $V_{COS}$, primary coil 32 is configured physically at an angle (θ) with, and in the same plane as, secondary coils 34 and 36. Secondary coils 34 and 36 may be physically configured at 90° relative to one another such that the signals 22a and 22b are 90° out of phase, which may be equivalent to how a resolver, such as primary resolver circuit 16, operates for sensor 12. Primary coil 32 is not moveable relative to secondary coils 34 and 36 to ensure that a constant reference condition output is provided as signals 22a and 22b for controller 18.

The angle (θ) between primary winding 32 with secondary windings 34 and 36, as well as the ratio of windings of primary coil 32 to the windings of secondary coils 34 and 36 affect the amplitude of each signal 22a and 22b. For the embodiments illustrated in FIGS. 2A-3C, primary coil 32 and secondary coils 34 and 36 may each have an equal winding count to ensure a desired amplitude for each output waveform. In other embodiments, the winding counts of each coil, as well as other properties of transformer 30, may be altered for each specific application in order to ensure that signals 22a and 22b match signals 20a and 20b of primary resolver circuit 16 for the specified reference condition.

By utilizing transformer 30 in this way, it is also ensured that static reference resolver circuit 14 is not negatively impacted by changes in temperature. For example, primary resolver circuit 16 may be implemented utilizing a rotating inductor that rotates along with the shaft of the sensor, and one or more stationary inductors that provide the analog output waveforms. Because the physics of transformer 30 are closely related to this example configuration of primary resolver circuit 16, any minor phase shifts or temperature variation in static reference resolver circuit 14 follows that of primary resolver circuit 16. This ensures that the static reference condition provided as signals 22a and 22b is as accurate as possible for sensor 12.

FIG. 3A illustrates a waveform corresponding to the embodiment illustrated in FIG. 2A. Sine wave ($V_{SIN}$) and cosine wave ($V_{COS}$) have an equivalent peak amplitude due to the angle (θ) between primary coil 32 and secondary coil 34 being 45°. The output $V_{SIN}$ may be provided as signal 22a and the output $V_{COS}$ may be provided as signal 22b. In the embodiments illustrated in FIGS. 1, 2A and 3A, an angle (θ) of 45° corresponds to equivalent magnitudes of waves $V_{SIN}$ and $V_{COS}$, but in other applications, it may be desirable to have an angle (θ) of 45° correspond to a different relationship in amplitudes of the waveforms, which may be accomplished by adjusting the number of windings, for example, of each of coils 34 and 36.

FIG. 2B illustrates an angle (θ) of 35° and FIG. 2C illustrates an angle (θ) of 55°. For example, $V_{SIN} \propto V_{REF}*\sin(\theta)$, and $V_{COS} \propto V_{REF}*\cos(\theta)$, with the actual amplitudes being dependent upon, for example, the turns ratio of primary coil 32 and secondary coils 34 and 36. As illustrated in FIG. 3B, with angle (θ) equal to 35°, $V_{COS}$ has an amplitude that is greater than that of $V_{SIN}$. In the embodiment illustrated in FIGS. 1, 2B and 3B, this matches signals 20a and 20b of primary resolver circuit 16 for an AOA of, for example, 35°. For the example embodiment described above for an AOA sensor, primary coil 32 may be configured for any angle between 0° and 90° to provide a respective reference condition. However, in other embodiments, transformer 30 may be configured to provide sine and cosine analog wave outputs as signals 22a and 22b that are indicative of any angular position between 0° and 360°.

As illustrated in FIG. 3C, with angle (θ) equal to 55°, $V_{COS}$ has an amplitude that is less than that of $V_{SIN}$. In the embodiment illustrated in FIGS. 1, 2C and 3C, this matches signals 20a and 20b of primary resolver circuit 16 for an AOA of, for example, 55°. In this way, a static reference resolver circuit may be implemented that utilizes the same voltage reference $V_{REF}$ as primary resolver circuit 16 and provides an output indicative of a selected reference condition that is the equivalent of the output of primary resolver circuit 16 for that sensed condition. Additionally, any number of static reference circuits 14 may be included in sensor 12. For example, each embodiment illustrated in FIGS. 2A-2C may be included in sensor 12 to provide three static reference outputs to controller 18, one at 35°, one at 45°, and one at 55°.

Discussion of Possible Embodiments

The following are non-exclusive descriptions of possible embodiments of the present invention.

A sensor includes a primary resolver circuit and a static reference resolver circuit. The primary resolver circuit is configured to provide first and second primary analog outputs. The primary analog outputs are indicative of a sensed condition of the sensor. The static reference resolver circuit includes a transformer and is configured to generate first and second reference analog outputs indicative of a reference condition of the sensor. The first and second reference analog outputs match the first and second primary analog outputs when the sensed condition is equivalent to the reference condition.

The sensor of the preceding paragraph can optionally include, additionally and/or alternatively, any one or more of the following features, configurations and/or additional components:

A further embodiment of the foregoing sensor, wherein the transformer includes a primary coil configured to receive a reference voltage, a first secondary coil coupled to the primary coil and configured to output the first reference analog output, and a second secondary coil coupled to the primary coil and configured to output the second reference analog output.

A further embodiment of any of the foregoing sensors, wherein the first secondary coil and the second secondary coil are configured to generate the first reference analog output ninety degrees out of phase with the second reference analog output.

A further embodiment of any of the foregoing sensors, wherein the first secondary coil is configured at a physical angle of ninety degrees from the second secondary coil.

A further embodiment of any of the foregoing sensors, wherein the primary coil is not moveable relative to the first and second secondary coils and is configured at a coil angle with the first secondary coil, and wherein the first and second reference analog outputs are based upon the coil angle.

A further embodiment of any of the foregoing sensors, further including a switch circuit configured to select between the first and second primary analog outputs and the first and second reference analog outputs for provision as first and second sensor analog outputs based upon a control input.

A method of operating a sensor includes receiving, by the sensor, a voltage reference; generating, using a transformer, a first reference analog voltage based on the voltage reference; generating, using the transformer, a second reference analog voltage based on the voltage reference, wherein the second reference analog voltage is ninety degrees out of phase with the first reference analog voltage; and providing the first and second reference analog voltages as a reference output indicative of a selected condition of the sensor.

The method of the preceding paragraph can optionally include, additionally and/or alternatively, any one or more of the following features, configurations and/or additional components:

A further embodiment of the foregoing method, wherein generating, using the transformer, the first reference analog voltage includes receiving, using a primary coil of the transformer, the voltage reference; and generating, using a first secondary coil of the transformer, the first reference analog voltage, wherein the first secondary coil of the transformer is electromagnetically coupled to the primary coil of the transformer.

A further embodiment of any of the foregoing methods, wherein generating, using the transformer, the second reference analog voltage includes generating, using a second secondary coil of the transformer, the second reference analog voltage, wherein the second reference output is ninety degrees out of phase with the first reference output.

A further embodiment of any of the foregoing methods, wherein the voltage reference is received from a controller.

A further embodiment of any of the foregoing methods, wherein providing the first and second reference analog voltages as the reference output comprises providing the reference output to the controller.

A further embodiment of any of the foregoing methods, wherein generating, using the first secondary coil of the transformer, the first reference analog voltage comprises configuring the primary coil at a physical coil angle in relation to the first secondary coil.

A further embodiment of any of the foregoing methods, using the second secondary coil of the transformer, the second reference analog voltage comprises configuring the second secondary coil physically at a ninety degree angle relative to the first secondary coil.

A further embodiment of any of the foregoing methods, further comprising outputting, using a resolver circuit, primary analog outputs indicative of a sensed condition of the sensor; selecting, using a switch circuit, a selected analog output between the reference outputs and the primary analog outputs; and providing, from the switch circuit, the selected analog output to the controller.

A system includes a sensor and a controller. The sensor includes a transformer circuit that includes a primary coil and first and second secondary coils. The primary coil is configured to receive a voltage reference from the controller. The first secondary coil is coupled to the primary coil and configured to provide a first reference analog output to the controller based on a coil angle between the primary coil and the first secondary coil. The second secondary coil is coupled to the primary coil and configured to provide a second reference analog output to the controller based upon the coil angle.

The system of the preceding paragraph can optionally include, additionally and/or alternatively, any one or more of the following features, configurations and/or additional components:

A further embodiment of the foregoing system, wherein the sensor further includes a primary resolver circuit configured to provide first and second primary analog outputs, wherein the first and second primary analog outputs are indicative of a sensed condition of the sensor, and wherein the first and second reference analog outputs match the first and second primary analog outputs when the sensed condition is equivalent to the reference condition.

A further embodiment of any of the foregoing systems, wherein the sensor further comprises a switch circuit configured to select between the first and second primary analog outputs and the first and second reference analog outputs for provision as first and second sensor analog outputs to the controller based upon a control input from the controller.

A further embodiment of any of the foregoing systems, wherein the primary coil is not moveable relative to the first and second secondary coils.

A further embodiment of any of the foregoing systems, wherein the second reference analog output is ninety degrees out of phase with the first reference analog output.

A further embodiment of any of the foregoing systems, wherein the first secondary coil is configured physically at a ninety degree angle relative to the second secondary coil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sensor comprising:
a primary resolver circuit configured to provide first and second primary analog outputs, wherein the primary analog outputs are indicative of a sensed condition of the sensor;
a static reference circuit comprising a transformer, wherein the static reference circuit is configured to generate first and second reference analog outputs indicative of a static reference condition of the sensor, wherein the first and second reference analog outputs match the first and second primary analog outputs when the sensed condition is equivalent to the static reference condition, and wherein the transformer comprises:
a primary coil configured to receive a reference voltage;
a first secondary coil coupled to the primary coil and configured to output the first reference analog output; and
a second secondary coil coupled to the primary coil and configured to output the second reference analog output, wherein the primary coil, the first secondary coil, and the second secondary coil are not moveable relative to one another; and
a switch circuit configured to select between the first and second primary analog outputs during normal operations and the first and second reference analog outputs during a test condition for provision as first and second sensor analog outputs based upon a control input.

2. The sensor of claim 1, wherein the first secondary coil and the second secondary coil are configured to generate the first reference analog output ninety degrees out of phase with the second reference analog output.

3. The sensor of claim 2, wherein the first secondary coil is configured at a physical angle of ninety degrees from the second secondary coil.

4. The sensor of claim 1, wherein the primary coil is not moveable relative to the first and second secondary coils and is configured at a coil angle with the first secondary coil, and wherein the first and second reference analog outputs are based upon the coil angle.

5. A method of operating a sensor, the method comprising:
receiving, by the sensor, a voltage reference;
generating, using a static transformer, a first reference analog voltage based on the voltage reference;
generating, using the static transformer, a second reference analog voltage based on the voltage reference, wherein the second reference analog voltage is ninety degrees out of phase with the first reference analog voltage;
providing the first and second reference analog voltages as static reference condition outputs indicative of a selected condition of the sensor;
outputting, using a resolver circuit, primary analog outputs indicative of a sensed condition of the sensor;
selecting, using a switch circuit, a selected analog output between the static reference condition outputs during a test condition and the primary analog outputs during normal operation; and
providing, from the switch circuit, the selected analog output to the controller.

6. The method of claim 5, wherein generating, using the static transformer, the first reference analog voltage comprises:
receiving, using a primary coil of the static transformer, the voltage reference; and
generating, using a first secondary coil of the static transformer, the first reference analog voltage, wherein the first secondary coil of the static transformer is electromagnetically coupled to the primary coil of the static transformer.

7. The method of claim 6, wherein generating, using the static transformer, the second reference analog voltage comprises:
generating, using a second secondary coil of the static transformer, the second reference analog voltage, wherein the second reference analog voltage is ninety degrees out of phase with the first reference analog voltage.

8. The method of claim 7, wherein the voltage reference is received from a controller.

9. The method of claim 8, wherein providing the first and second reference analog voltages as the static reference condition outputs comprises providing the static reference condition outputs to the controller.

10. The method of claim 7, wherein generating, using the first secondary coil of the static transformer, the first reference analog voltage comprises configuring the primary coil at a physical coil angle in relation to the first secondary coil.

11. The method of claim 10, wherein generating, using the second secondary coil of the static transformer, the second reference analog voltage comprises configuring the second secondary coil physically at a ninety degree angle relative to the first secondary coil.

12. A system comprising:
a controller; and
a sensor comprising:
a static transformer circuit comprising:
a primary coil configured to receive a voltage reference from the controller;
a first secondary coil coupled to the primary coil and configured to provide a first reference analog output to the controller based on a coil angle between the primary coil and the first secondary coil; and a second secondary coil coupled to the primary coil and configured to provide a second reference analog output to the controller based upon the coil angle, wherein the first and second reference analog outputs are indicative of a static reference condition;

a primary resolver circuit configured to provide first and second primary analog outputs, wherein the first and second primary analog outputs are indicative of a sensed condition of the sensor, and wherein the first and second reference analog outputs match the first and second primary analog outputs when the sensed condition is equivalent to the static reference condition; and a switch circuit configured to select between the first and second primary analog outputs during normal operation and the first and second reference analog outputs during a test condition for provision as first and second sensor analog outputs to the controller based upon a control input from the controller.

13. The system of claim 12, wherein the primary coil is not moveable relative to the first and second secondary coils.

14. The system of claim 12, wherein the second reference analog output is ninety degrees out of phase with the first reference analog output.

15. The system of claim 14, wherein the first secondary coil is configured physically at a ninety degree angle relative to the second secondary coil.

* * * * *